United States Patent
Colon et al.

(10) Patent No.: US 12,047,408 B1
(45) Date of Patent: Jul. 23, 2024

(54) DETECTION OF ANOMALOUS COMPUTER-IMPLEMENTED SERVICE ACTIVITY

(71) Applicant: Amazon Technologies, Inc., Seattle, WA (US)

(72) Inventors: Brendan Cruz Colon, Seattle, WA (US); Matt Michael Sommer, Issaquah, WA (US); Joshua Scott Hansen, Sahuarita, AZ (US); Dennis Naylor Brown, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 17/745,441

(22) Filed: May 16, 2022

(51) Int. Cl.
H04L 9/40 (2022.01)

(52) U.S. Cl.
CPC ...... H04L 63/1458 (2013.01); H04L 63/0236 (2013.01); H04L 63/1416 (2013.01); H04L 63/1425 (2013.01); H04L 63/20 (2013.01)

(58) Field of Classification Search
CPC ............. H04L 63/1458; H04L 63/0236; H04L 63/1416; H04L 63/1425; H04L 63/20
See application file for complete search history.

(56) References Cited

U.S. PATENT DOCUMENTS

| | | | | |
|---|---|---|---|---|
| 5,606,645 | A * | 2/1997 | Matsuura | G10L 15/142 704/256 |
| 10,165,000 | B1 * | 12/2018 | Aziz | H04L 63/1491 |
| 10,353,764 | B1 * | 7/2019 | Cazzanti | H04L 41/147 |
| 11,038,906 | B1 * | 6/2021 | Bingham | H04L 63/1425 |
| 2006/0100874 | A1 * | 5/2006 | Oblinger | G10L 15/144 704/E15.029 |
| 2015/0207812 | A1 * | 7/2015 | Back | H04L 63/1408 726/23 |
| 2015/0339680 | A1 * | 11/2015 | Takahashi | G06Q 10/06 705/7.29 |

(Continued)

OTHER PUBLICATIONS

Rahnavard, Gholamali, Meisam SA Najjar, and Somaye Taherifar. "A method to evaluate web services anomaly detection using hidden markov models." 2010 International Conference on Computer Applications and Industrial Electronics. IEEE, 2010. (Year: 2010).*

(Continued)

*Primary Examiner* — Theodore C Parsons
*Assistant Examiner* — Sameera Wickramasuriya
(74) *Attorney, Agent, or Firm* — K&L Gates LLP

(57) ABSTRACT

Devices and techniques are generally described for anomalous network activity detection. In various examples, first application log data comprising a plurality of computer log actions may be received. A hidden Markov model associated may generate a first hidden state vector, where a first value of the first hidden state vector is associated with anomalous activity. A first timing vector associated with a first account may be determined, wherein the timing vector indicates first time periods of typical activity and second periods of typical inactivity for the first account. A first number of elements of the first hidden state vector that have the first value and which correspond to the second time periods of the first timing vector may be determined. Network access may be disabled for the first account.

20 Claims, 6 Drawing Sheets

(56) References Cited

U.S. PATENT DOCUMENTS

2016/0285700 A1* 9/2016 Gopalakrishnan ..... G06N 20/00
2019/0222595 A1* 7/2019 Giani .................... G06F 18/295
2023/0344842 A1* 10/2023 Akhtar ................ H04L 63/1425

OTHER PUBLICATIONS

Hoang, X. A., and Jiankun Hu. "An efficient hidden Markov model training scheme for anomaly intrusion detection of server applications based on system calls." Proceedings. 2004 12th IEEE International Conference on Networks (ICON 2004)(IEEE Cat. No. 04EX955). vol. 2. IEEE, 2004. (Year: 2004).*

* cited by examiner

DETECTION OF ANOMALOUS COMPUTER-IMPLEMENTED SERVICE ACTIVITY

BACKGROUND

Denial-of-service (DoS) attacks, unauthorized data exfiltration, and other computer-network based attacks continue to grow year-over-year, putting pressure on online entities and network administrators to innovate in order to protect customers, revenue, and prevent service disruption. The field of online fraud detection and cyberattack prevention can be categorized as an adversarial environment, where those with intentions to commit fraud and/or malicious cyber attacks are pitted against those endeavoring to prevent and deter such activity. This "arms race," as it is often referred to, involves continuous adaptation, as tactics of the opponents evolve over time.

DETAILED DESCRIPTION

Figure 1:
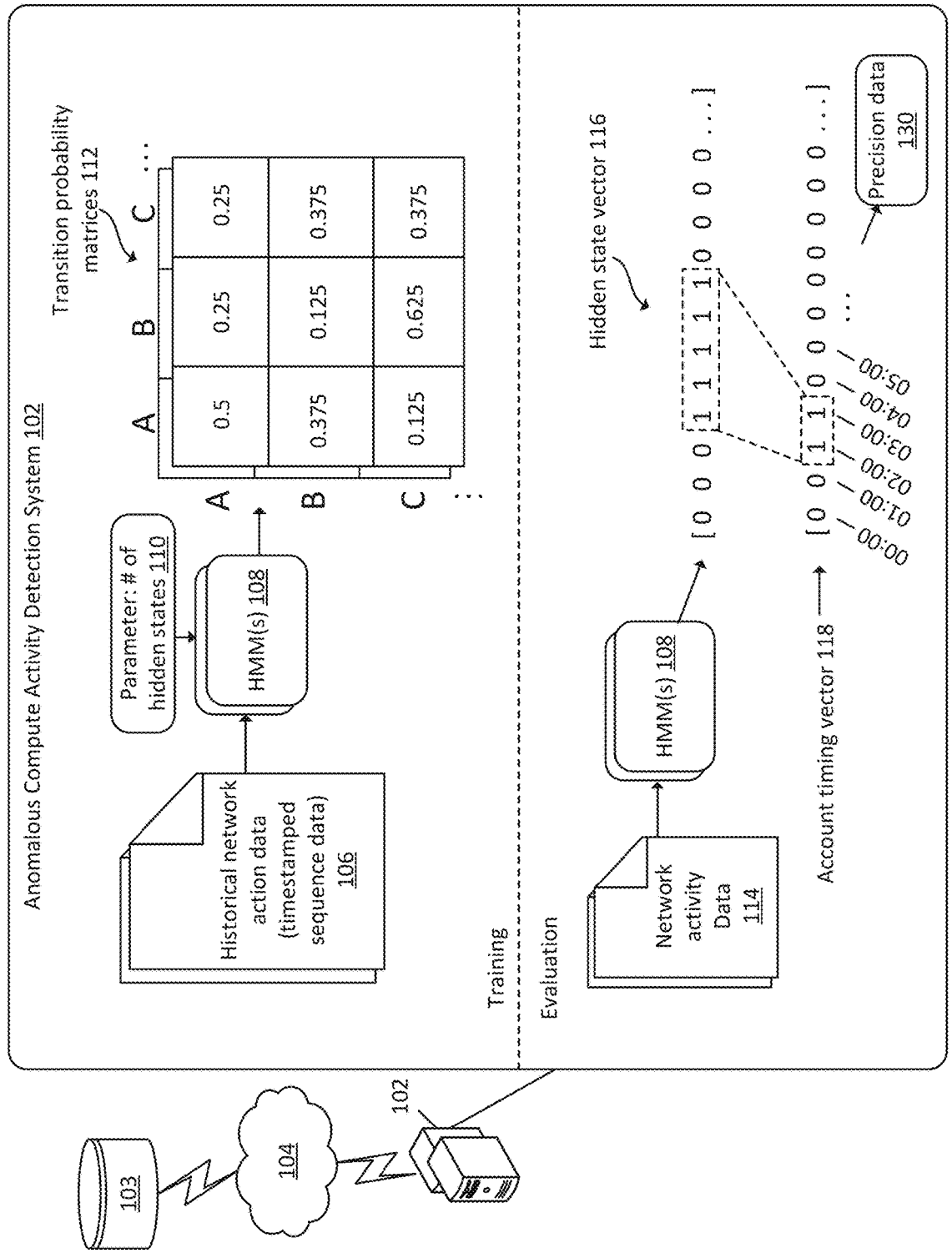
FIG. 1 is a block diagram illustrating an anomalous computer-implemented service activity detection system, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Perpetrators of cyber-attacks and/or other "fraudsters" continually attempt to modify their behavior and/or the characteristics of their attacks and/or fraudulent transactions in order to avoid detection by automated filters. As a result, technologies are continuously developed by fraud prevention and cyber-security teams to attempt to detect and prevent such attacks in an ever-evolving climate. Accordingly, the actions of perpetrators of fraud and other cyber attacks and cyber security teams are adversarial in nature, as a change in attack detection techniques results in evolving attack methodologies, and vice versa.

In some cases, attacks come from outside sources that gain access to secure networks and/or computer services through phishing, stolen credentials, etc. However, in some cases, the sources of attacks are insiders that are authorized users who take unauthorized actions (e.g., sensitive data exfiltration, etc.). In large computer networks and institutions, users cannot be individually monitored by system administrators to ensure that no bad actors are performing unauthorized operations. Accordingly, automatic computer systems may be used to monitor for network-based attacks. Network-based attacks may include data exfiltration (whether from an internal or external source), transactional fraud (e.g., concession abuse fraud, payment fraud, etc.), ransomware attacks, etc.

However, even such automated detection systems suffer shortcomings. For example, a typical automated computer-implemented service anomaly detection system may be a Boolean detection system indicating that action X has been performed Y (or more) times within Z timeframe. However, such Boolean detection systems require careful planning and/or empirical testing to determine the appropriate actions to measure and the appropriate thresholds for such actions. If thresholds are set too low (e.g., for a read action on sensitive data, for example) high false positives can result, ultimately wasting resources to investigate such false positives. Conversely, if thresholds are set too high, anomalous actions and/or computer-implemented service attacks (such as attacks on computer networks and/or applications) may slip through undetected. Additionally, Boolean detections are not inherently descriptive, often times missing the entire sequence of computer actions that are the modus operandi of the attack as a result of focus on a specific action. Described herein, are techniques that may detect anomalous computer-implemented service activity in order to detect and/or automatically prevent computer attacks. Anomalous computer-implemented service activity may refer to any type of anomalous computer-based action, as determined/defined by network and/or service administration policies and/or as determined by comparison with typical network usage patterns. For example, in some cases, anomalous computer-implemented service activity may comprise unauthorized or unusual data access, exfiltration, unusual port usage, unauthorized and/or unusual scripting, etc.). Computer-implemented services may include a variety of physical and/or virtual compute resources that may function together as a service in order to provide desired functionality.

In various examples described herein, an ensemble of Hidden Markov Models (HMMs) are deployed using a computer-implemented anomalous compute activity detection system 102 that are effective to automatically detect attack procedures. HMMs are a formal approach for creating probabilistic models to label sequences. HMMs traverse a linear sequence of events (e.g., timestamped computer actions) and assign a probability that the sequence correlates to some underlying state. For example, HMMs are ubiquitous in bioinformatics for their ability to predict genes (the underlying state) based on the sequence of DNA observed.

As used herein, computer-implemented service activity refers to not only network activity such as opening and closing network communication ports, sending/receiving packets and/or other data, but also to any computer actions that may be tracked remotely. In various examples, accounts may be provided network and/or distributed computing access to sandboxed operating systems in which all actions of the accounts are tracked by the network. Accordingly, any computer-related actions taken while logged in to the network may be logged. For example, application log data, CRUD operations (create, read, update, delete), system calls, and any other computer-based operation (alone, in combination with other events, and/or with attending metadata) may be considered network activity and may serve as an input to one or more HMMs in the various systems and techniques described herein. The systems and techniques described herein are able to detect and model attack procedures and patterns that would not be apparent to a human analyzing the data using current techniques due to the multivariate nature of the problem and large amount of data processed using such techniques.

In various examples, a sequence of computer actions (e.g., network activity) is defined. The defined computer actions serving as input to the HMM depend on the particular implementation. Example actions may include particular system calls, CRUD operations, opening particular network ports, logins, access to particular databases (and/or CRUD operations within such databases), application log actions, etc., start times of various events, stop times of various events, etc. In addition, some actions may be qualified on the basis of defined conditions. For example, a particular read operation may only be considered a computer action for the purposes of input to the HMMs described herein if it relates to a particular type of data (e.g., sensitive personally-identifiable data). In another example, such a read action may be defined (for purposes of the HMM) as a separate computer-action relative to a different type of read action. In another example, actions may be qualified based on timing information (e.g., read operations happening within 3 seconds (or some other threshold) of one another) may be qualified as read_attempt_rapid.

Computer actions (as defined for the particular implementation of the anomalous compute activity detection systems and techniques described herein) may be intercalated based on timestamp data (defining a time at which each action occurred) to provide a chronologically accurate series of such actions. These actions may be further enriched by such metadata as the application name generating the action, notable deviations, and/or descriptions such as events happening within 3 seconds of each other, event type, etc.

Examples of events may include:
SimpleUserService—SignInAttempt (login attempt)
Rapid—CscUserAccountSummaryRead (User account summary read within three seconds of previous action)

All actions with their descriptions may be integer encoded yielding a large amount of action types (e.g., thousands). An ensemble of HMMs may be trained for a specific account (e.g., a specific account with network access) for actions in a trailing time period (e.g., four days, seven days, one day, or any other desired amount of time) with each HMM model leveraging different optimizer logic for defining a hidden state. For example, three HMMs may be implemented using Gaussian HMM, Gaussian Mixed Model HMM, and Multinomial HMM. In this example, the three HMMs are trained for each account being evaluated for anomalous computer-implemented service activity. Each of the HMMs may be trained to classify actions as belonging to one of two possible hidden states (0 or 1). The number of hidden states may be a parameter of the HMM model and more than two hidden states may be selected, as desired. During training, each HMM model learns a transition probability matrix representing the probability of transitioning from a current action to a next action based on the sequence of actions used to train the HMM. A transition probability matrix is learned for each hidden state.

The anomalous compute activity detection system may correlate either hidden state value (e.g., 0 or 1, in the binary case) to anomalous network activity (or known attack activity). In addition, the anomalous compute activity detection system may generate a timing vector for each account under evaluation. The timing vector may represent various time periods during each day of the week. For example, a timing vector may include an element for each hour of the day for each day of the week (e.g., 7×24=168 dimensions). In some examples, the timing vector may have binary values indicating whether (on average) a particular account has performed (or is otherwise associated with) greater than a threshold number of computer actions for the relevant element (e.g., for the relevant hour of the relevant day that corresponds to the vector element). For example, for a vector element representing 1:00 pm on Saturday, a 0 value may represent that the average number of actions taken by the account during the 1-2 pm hour on Sundays (e.g., based on 150 days (or some other amount of time) of trailing data) is less than 3.5 (or some other desired threshold), while a 1 value may represent that the average number of actions taken by the account during the 1-2 pm hour on Sundays exceeds the threshold. Accordingly, the timing vector may represent hours of the week that are typically associated with account activity with a 1 (or 0, depending on the implementation) and hours of the week that are typically associated with account inactivity with a 0 (or 1, depending on the implementation).

The hidden state vector output by each HMM of the anomalous compute activity detection system may be correlated with the timing vector for the account under evaluation. If anomalous network activity (e.g., a hidden state value of 1) is correlated with typical periods of inactivity (e.g., hours that are unusual for the particular account to be taking actions and/or hours with an absence of computer activity) this may be a strong indicator of an attack and/or fraudulent behavior. These techniques are particularly useful for detecting internally-perpetrated attacks since accounts are typically associated with similar timings of account activity from week-to-week. Accordingly, taking anomalous actions (as evidenced by the hidden state vector of the HMM) during unusual hours for account activity (as determined using the timing vector) may be highly correlated with an attack. In addition, in some cases a sequence of actions taken by a particular account may lead to the account's operating system being "bricked" (e.g., where the account is locked out and may not perform any actions while logged in). In some examples, the sequence of network activity data and the HMM models of the anomalous compute activity detection system described herein may be used to determine the pattern of activity that led to the operating system being bricked. For example, network logs may be used to determine the sequence of actions leading to a crash. This information may be used to detect and/or prevent future operating system crashes.

FIG. 1 is a block diagram illustrating example components of an anomalous compute activity detection system 102, according to various embodiments of the present disclosure. In various examples, one or more computing devices may implement the anomalous compute activity detection system 102. In examples where more than one computing device implements the anomalous compute activity detection system 102, the different computing devices may communicate with one another over a network 104. In various examples, each of the one or more computing devices used to implement anomalous compute activity detection system 102 may comprise one or more processors. The one or more computing devices used to implement anomalous compute activity detection system 102 may be configured in communication with at least one non-transitory computer readable memory 103 ("memory 103"). In at least some examples, the one or more computing devices used to implement anomalous compute activity detection system 102 may communicate with memory 103 over network 104. The memory 103 may store computer-readable instructions that, when executed by at least one processor of the one or more computing devices implementing anomalous compute activity detection system 102, may be effective to program the one or more processors to perform the various techniques described herein.

In various examples, network 104 is a wide area network, such as the Internet, while in other embodiments, the network 104 is a local area network (LAN) over which requests may be received. In some further embodiments network 104 is a combination of the Internet and a LAN.

In various examples, the anomalous compute activity detection system 102 may receive historical network action data 106. As previously described, the action data may be a timestamped sequence of actions (e.g., sequence data). The actions may be defined according to the desired implementation, but the actions generally refer to network activity including any computer actions that may be remotely tracked. As previously described, some examples actions may include particular system calls, CRUD operations, opening particular network ports, logins, access to particular databases (and/or CRUD operations within such databases), application log actions, etc., start times of various events, stop times of various events, etc. In addition, some actions may be qualified on the basis of defined conditions. For example, a particular read operation may only be considered a computer action for the purposes of input to the HMMs described herein if it relates to a particular type of data (e.g., sensitive personally-identifiable data). In another example, such a read action may be defined (for purposes of the HMM) as a separate computer-action relative to a different type of read action. In another example, actions may be qualified based on timing information (e.g., read operations happening within 3 seconds (or some other threshold) of one another) may be qualified as read_attempt_rapid.

The number of hidden states 110 may be supplied as a parameter to the one or more HMMs 108. As previously described, in some cases, an ensemble of HMMs may be trained for each account being evaluated. Each HMM may leverage different optimizer logic defining a hidden state. Examples of HMM models may be Gaussian HMM, Gaussian Mixed Model HMM, Multinomial HMM, etc. During training, each HMM 108 may learn a transition probability matrix 112 for each hidden state. In some examples herein, the number of hidden states 110 may be selected as two. There may be a notion that one hidden state (e.g., 0) corresponds to normal network activity, while the other hidden state (e.g., 1) corresponds to anomalous network activity. However, there may be no way to tell, for each HMM 108, which hidden state value corresponds to which condition. For example, 0 may correspond to the "anomalous" activity state for one model, while 1 may correspond to the "anomalous" activity state for another model. As described in further detail below, a state transition that corresponds with unusually-timed activity (determined using account timing vector 118 (e.g., a binary timing vector)) may be used to disambiguate the hidden states.

Transition probability matrices 112 indicate the probability that an account that is currently taking a first network action will next take another network action. The transition probability matrices 112 are specific to a hidden state of the HMM(s) 108 and are learned using the historical network action data 106 (e.g., some past time period of actions taken by an account under evaluation). For example, if an account makes system call A, the transition probability matrices provides respective probabilities of the next action that will be taken by the account (e.g., next action probabilities). In the simple example depicted in FIG. 1, if an account takes action A, there is a probability of 0.5 that the next action will again be action A, a probability of 0.375 that action B will be taken, and a probability of 0.125 that action C will be taken. Similarly, if an account takes action B, there is a probability of 0.25 that the next action taken will be action A, a probability of 0.125 that the next action taken will again be action B, and a probability of 0.625 that the next action taken will be action C, and so on.

Since there may be a large number (e.g., tens of thousands) of actions defined by the anomalous compute activity detection system 102, the transition probability matrices 112 may be large resulting in an enormous amount of processing time and computational resource consumption at scale. Accordingly, for each account, the transition probability matrices 112 may only represent those actions that have actually been taken at least a threshold number of times (e.g., at least once) by the account to reduce the sparsity of the matrices and the complexity of computation. The transition probability matrices 112 may be stored in non-transitory computer readable memory 103 in association with account identifier data that uniquely identifies the account to which the transition probability matrices 112 pertain.

After training the HMM(s) 108 to determine the transition probability matrices 112 for a given account identifier (e.g., identifying an account), anomalous compute activity detection system 102 may be ready for evaluation of the account. Network activity data 114 may be received that is associated with computer actions taken by the account over a certain time period (e.g., the preceding 4 days or any other desired time period). The network activity data 114 may be time-stamped (with each action having a timestamp) and may be input into the HMM(s) 108. Each HMM 108 may generate a hidden state vector 116. In the example depicted in FIG. 1, the hidden state vector 116 is a binary vector (e.g., the number of hidden states 110 is two) of [0 0 0 1 1 1 1 1 0 0 0 0 . . . ]. A hidden state value of 0 or 1 is predicted by the HMM 108 for each time stamp action. The hidden state value is determined based on the sequence of actions and represents whether the account is currently believed to be performing anomalous activity or whether the account is performing routine activity based on the transition probability matrices 112 and the network activity data 114. However, the hidden state vector 116, without more, does not provide any information as to which state (0 or 1) corresponds to anomalous and which state corresponds to routine network activity.

The anomalous compute activity detection system 102 may determine an account timing vector 118 for the account. The account timing vector 118 represents various time periods during each day of the week. For example, the account timing vector 118 may include an element for each hour of the day for each day of the week (e.g., 24×7=168 dimensions (one dimension per unique hour of the week)). In some examples, the account timing vector 118 may have binary values indicating whether (on average) a particular account has performed (or is otherwise associated with) greater than a threshold number of computer actions for the relevant element of the account timing vector 118 (e.g., for the relevant hour of the relevant day that corresponds to the vector element). For example, for a timing vector element representing 1:00 am on Saturday, a 1 value may represent that the average number of actions taken by the account during the 00:00-01:00 hour on Saturdays (e.g., based on 150 days (or some other desired number) of trailing data) is less than 2 (or some other desired threshold), while a 0 value may represent that the average number of actions taken by the account during the 00:00-01:00 hour on Saturdays exceeds the threshold. Accordingly, the timing vector may represent hours of the week that are typically associated with account activity with a 0 (or 1, depending on the implementation) and hours of the week that are typically associated with account inactivity with a 1 (or 0, depending on the implementation). In the example account timing vector 118, a 1 value may represent an hour/day combination typical of inactivity (e.g., an hour during which the account is typically not associated with a sufficiently high volume of computer actions, based on the predefined thresholds). Conversely, a 0 may represent an hour that is typical of activity for the account. For example, if the account is related to a system administrator, the 0 may represent an hour during which the system administrator is typically performing authorized network administration actions.

In the example depicted in FIG. 1, the account timing vector 118 has 1 values at the 02:00 and 03:00 hours (e.g., of a certain day) indicating that the account is typically not associated with computer actions at these times. Additionally, the anomalous compute activity detection system 102 may determine a correspondence between the values of the hidden state vector 116 and these elements of the account timing vector 118 (as denoted using the dashed boxes). The anomalous compute activity detection system 102 may determine the correlation since each action (and thus each hidden state value of hidden state vector 116) is timestamped. The anomalous compute activity detection system 102 may determine that the timestamps of the 1 values of the hidden state vector correspond to the hours having a 1 value of the account timing vector 118 (as represented using the dashed boxes). The anomalous compute activity detection system 102 may disambiguate the binary values of the hidden state vector 116 (e.g., may determine which binary value corresponds to anomalous activity vs. which binary value corresponds to non-anomalous activity) by determining a correlation of these values with the periods typically related to inactivity. This disambiguation is predicated on the high correlation between unusual activity hours (e.g., hours typically correlated with inactivity regarding a particular account) and network attacks/fraudulent activity. The account timing vectors 118 are generated for each account under evaluation. This is important as different accounts may be associated with different hours/days of typical activity.

In the example depicted in FIG. 1, the hidden state vector 116 transitions from 0 to 1 and remains at 1 during the hours typical of inactivity (e.g., 02:00-04:00). Accordingly, 1 may be determined as the hidden state value that corresponds to anomalous network activity. In various examples, precision data 130 may be generated by the anomalous compute activity detection system 102. The precision data 130 may be determined by determining a number of hidden state values indicating anomalous activity (e.g., the number of "1" values in the hidden state vector 116) that are also associated with times of inactivity (from the account timing vector 118) and dividing this number by the total number of hidden state values indicating anomalous activity. For example, if there are five "1" values in the hidden state vector 116 that also correspond to unusual timing (determined using timestamp values), but there are eleven total "1" values in the hidden state vector 116, the precision data 130 may be determined as the ratio 5/11=0.454545. In some examples, the precision data 130 may also be determined under the assumption that the other hidden state value (e.g., 0 in the current example) represent anomalous activity. The higher precision score may be used to determine the anomalous hidden state. For example, if the precision data 130 that takes "1" as the anomalous hidden state is 0.454545, but the precision data 130 that takes "0" as the anomalous hidden state is 0.57, then 0 may be used as the anomalous hidden state for the HMM 108.

Although a precision score (e.g., precision data 130) is described in the foregoing examples, a Euclidean distance (or cosine similarity) between the hidden state vector 116 and the account timing vector 118 may instead be used to determine anomalous network activity by the account. In various examples, the average of the precision data 130 (e.g., an average precision score) generated by each HMM 108 of the ensemble of HMMs 108 may be used to determine the final precision data 130.

In various examples, if the ensemble precision data 130 exceeds a threshold value (e.g., a threshold precision score), a remedial action may be taken. In various examples, the network access and/or computer-implemented service access may be temporarily (or permanently) disabled for the account while the activity is investigated for potential fraud. In other examples, a privileged level and/or level of access associated with the account may be modified. In various examples, the account may be flagged and another system may be triggered to determine whether the account is participating in an attack on the network and/or fraudulent activity.

Figure 2:
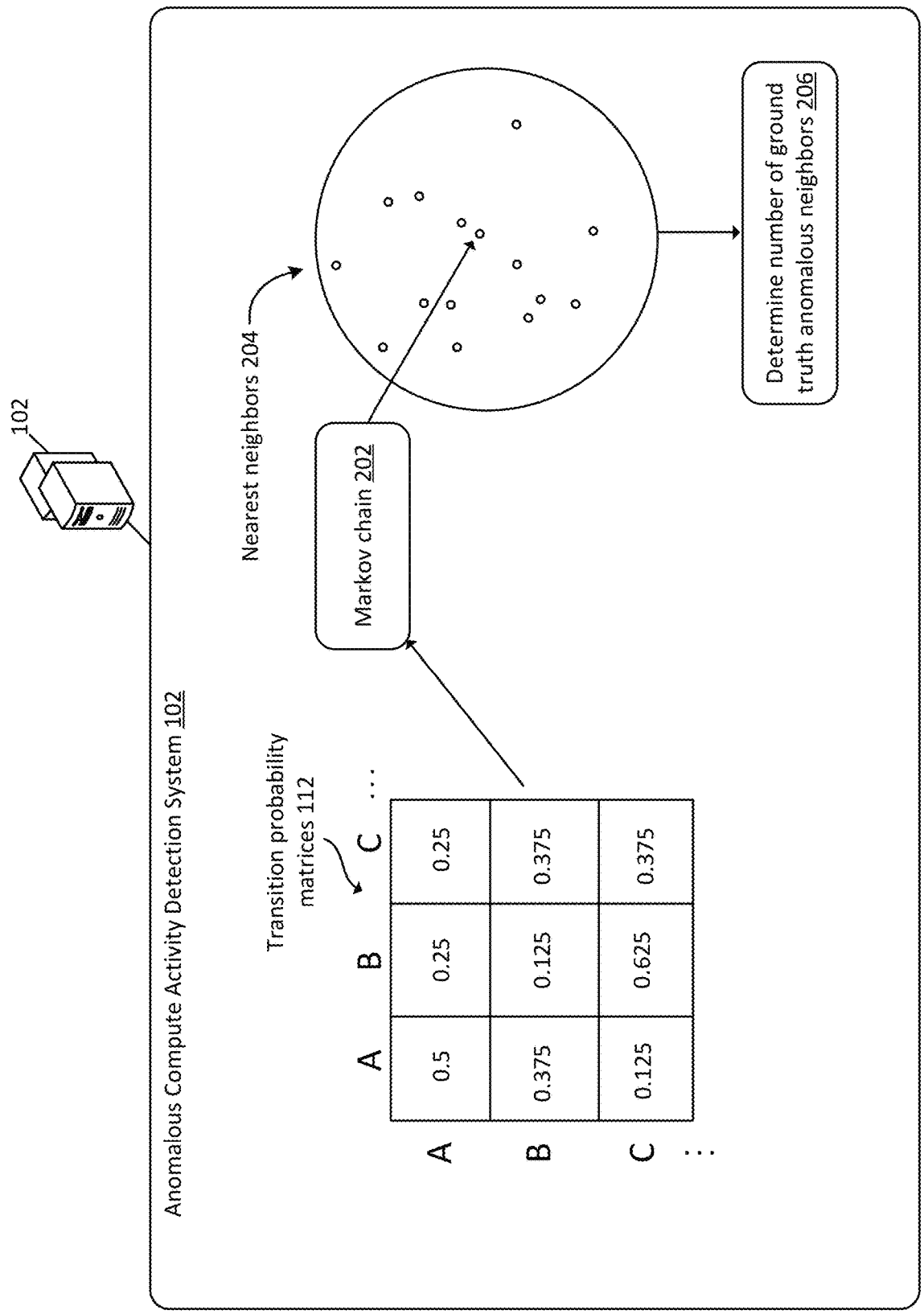
FIG. 2 is a block diagram illustrating detection of anomalous computer-implemented service activity, in accordance with various embodiments of the present disclosure.

FIG. 2 is a block diagram illustrating detection of anomalous network activity, in accordance with various embodiments of the present disclosure. As previously described, in various examples, the transition probability matrices 112 may be stored in association with account identifier data. In various examples, anomalous network activity may be investigated using anomalous compute activity detection system 102 irrespective of whether the anomalous activity occurs during atypical network activity hours for the account.

For example, for a given account being evaluated, the anomalous compute activity detection system 102 may retrieve the transition probability matrix 112 (corresponding to the anomalous activity hidden state) and may simulate a number N (e.g., N=1000, 2000, 500, 12,000, etc.) of actions using the probabilities in the transition probability matrix 112 to generate the Markov chain 202. In some examples, a transition probability matrix 112 for a given account may be based on a relatively small sample size of actions. In such examples, the Markov chain generated from such an account may be skewed toward the actions taken during a relatively short amount of time by the account. For that reason, the size of the Markov chain generated for an account may be correlated with the number of actual actions taken by the account to attempt to avoid overfitting a Markov chain to a relatively small number of account actions. In some further examples, if the number of actions taken by an account is less than some threshold amount, the account may not be evaluated using the procedure shown and described in reference to FIG. 2. As previously described, the transition probability matrices 112 may be generated repeatedly (e.g., based on some time period of trailing data (e.g., 3 days, 4 days, 5 days, 6 days, etc.)).

In addition, Markov chains may be generated for various other accounts, including accounts associated with known attacks/fraudulent activity, by retrieving the respective transition probability matrices 112 for these other accounts and simulating a number of actions. Thereafter, the activity vector for the account under evaluation may be compared, in the vector space, to various other accounts to determine if there is a similarity (and, if so, to what degree) between the actions of the subject account and those of known attacks/fraudulent activity.

For example, the Euclidean distance and/or cosine similarity may be determined between the subject account activity vector (e.g., Markov chain 202) and the activity vectors associated with different accounts (including those associated with known fraud/known attacks). If the Euclidean distance is less than a particular threshold to one or more known attack activity vectors, remedial action may be taken, as described above.

In another example implementation, a nearest neighbor algorithm (e.g., K-nearest neighbors (KNN)) may be used to determine the K most similar activity vectors in the vector space (e.g., nearest neighbors 204). Thereafter, the number of the nearest neighbors 204 associated with known fraudulent/attack activity may be determined (e.g., block 206) (a subset of the nearest neighbors 204). In some examples, the average distance between the subject activity vector and the activity vectors associated with known fraudulent/attack activity may be determined. If the number of known nearest neighbors 204 associated with known fraudulent/attack activity (e.g., members of the subset of nearest neighbors 204 associated with known anomalous network activity) exceeds a threshold and/or the average distance between the subject activity vector and the activity vectors associated with known fraudulent/attack activity is below a certain threshold, remedial action may be taken.

In another example implementation, the nearest neighbor algorithm may be used to determine the K most similar activity vectors in the vector space to an account activity vector (e.g., Markov chain 202) that is known to be related to fraudulent/attack activity. Thereafter, the nearest neighbors may be investigated to determine the accounts that are most similar to the known attack/fraudulent account.

Figure 3:
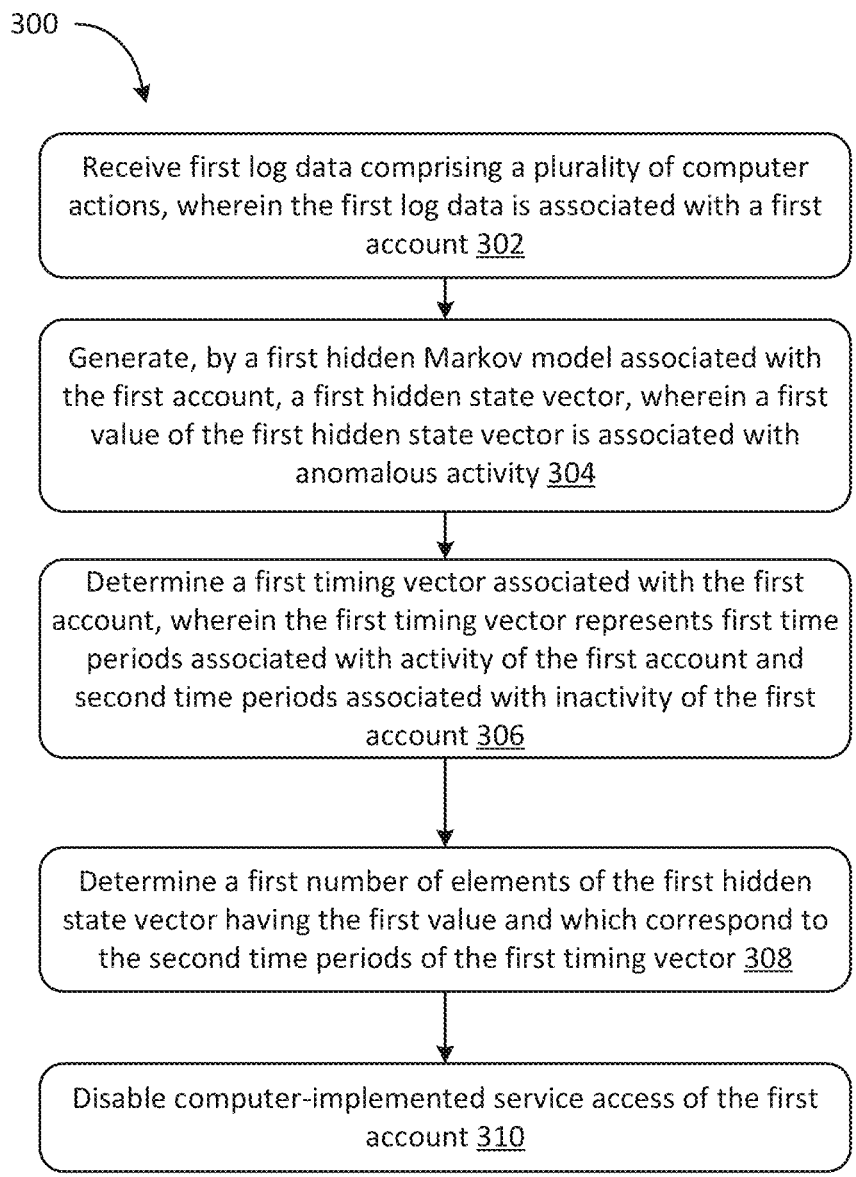
FIG. 3 is a flow diagram illustrating an example process for detection of anomalous computer-implemented service activity, in accordance with various aspects of the present disclosure.

FIG. 3 depicts a flow chart showing an example process 300 for detection of anomalous network activity, in accordance with various aspects of the present disclosure. The process 300 of FIG. 3 may be executed by one or more computing devices. The actions of process 300 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 300 may be described above with reference to elements of FIGS. 1-2.

Process 300 may begin at action 302, at which first log data comprising a plurality of computer actions may be received, where the first application log data is associated with a first account. The computer actions may be application log messages, CRUD actions, login actions, etc. The particular computer actions depend on the action definitions used during a particular implementation. The first log data may pertain to a particular subject account.

Processing may continue at action 304, at which a first HMM associated with the first account may generate a first hidden state vector. The first HMM may generate the first hidden state vector using the first log data as input. A first value of the first hidden state vector may be associated with anomalous activity. In some examples, the first hidden state vector may be a binary vector with values of 0 or 1. In various examples, the value 1 (or the value 0) may be associated with anomalous activity.

Processing may continue at action 306, at which a first timing vector associated with the first account may be determined. The first timing vector may represent first time periods (e.g., hours of the day for each day of the week) associated with activity of the first account and second time periods associated with inactivity of the first account. For example, a 0 may represent a time period typically associated with network activity for the first account, while a 1 may represent a time period typically associated with network inactivity for the first account. It should be noted that the 0 and 1 values are arbitrary and may be flipped to generate a modified hidden state vector, depending on the implementation.

Processing may continue at action 308, at which a first number of elements of the first hidden state vector having the first value and which correspond to the second time periods of the first timing vector may be determined. For example, the number of elements of the first hidden state vector that both indicate anomalous activity and which correspond (determined using timestamps) to hours typically associated with inactivity may be determined.

Processing may continue at action 310, at which network access and/or computer-implemented service access of the first account may be disabled. For example, if the precision data determined using the first number of elements from action 308 exceeds a threshold precision value, remedial action such as disabling network access and/or suspending login credentials may be taken. The precision data may be determined by dividing the number of elements of the first hidden state vector that both indicate anomalous activity and which correspond (determined using timestamps) to hours typically associated with inactivity by the total number of elements of the first hidden state vector indicating anomalous activity. Additionally, as previously described, the correlation between the hidden state vector and the account timing vector may be used to disambiguate which hidden state value corresponds to anomalous activity (using the higher precision data score).

Figure 4:
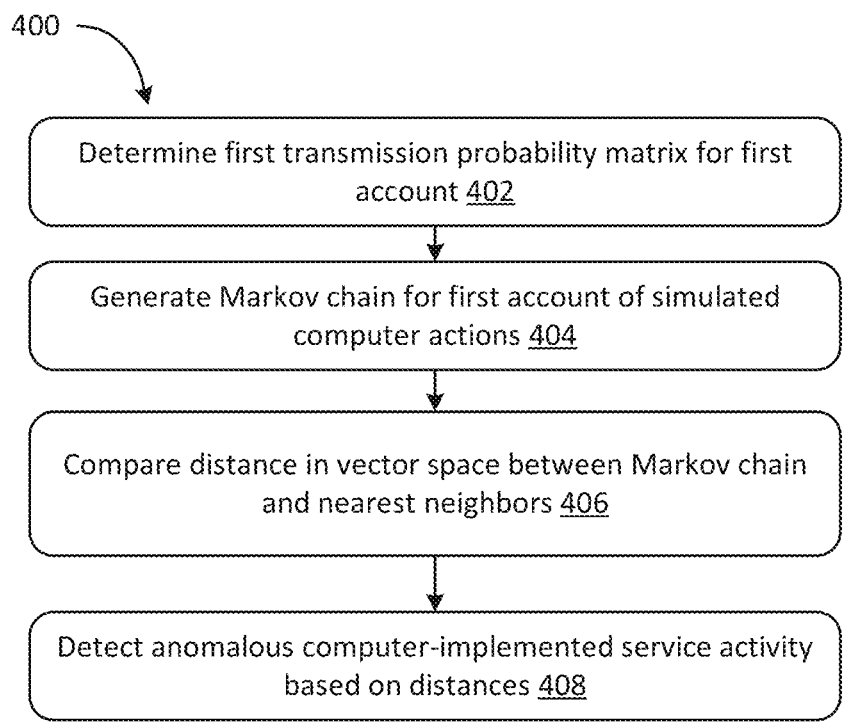
FIG. 4 is a flow diagram illustrating another example process for detection of anomalous computer-implemented service activity, in accordance with various aspects of the present disclosure.

FIG. 4 is a flow diagram illustrating another example process 400 for detection of anomalous network activity, in accordance with various aspects of the present disclosure. The process 400 of FIG. 4 may be executed by one or more computing devices. The actions of process 400 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 400 may be described above with reference to elements of FIGS. 1-3.

Process 400 may being at action 402, at which a first transmission probability matrix may be determined for a first account. The first transmission probability matrix may be determined using past activity data determined for the first account. The past activity data may include a sequence of computer actions taken by the first account. In various examples, there may be timestamps defining a time at which each action of the sequence of actions was taken. However, in some examples, timestamp data may not be necessary for the process 400. The first transmission probability matrix may be stored in memory in association with an account identifier identifying the first account. The transmission probability matrix may be a transmission probability matrix learned during training of an HMM 108 which is associated with an anomalous activity hidden state. The anomalous activity hidden state may be disambiguated from other hidden states by correlating the anomalous activity hidden state values (in the hidden state vector) with unusual network activity timing (using the account timing vector 118).

Processing may continue at action 404, at which a Markov chain may be generated for the first account. The Markov chain may represent simulated computer actions (e.g., actions defined for the HMM 108 during training). For example, using the transition probability matrix 112 shown in FIG. 1, a first action may be simulated as action A. The next action may be action A with a probability of 0.5, action B with a probability of 0.375, and action C with a probability of 0.125. The anomalous compute activity detection system 102 may simulate the next action and may select action C. For action C, the next action may be action A with a probability of 0.25, action B with a probability of 0.375, or action C again with a probability of 0.375. The anomalous compute activity detection system 102 may simulate the next action and may select action B. Accordingly, the simulated Markov chain may be [A, C, B, . . . ]. The simulation may continue until a desired length of the activity vector is reached.

Processing may continue at action 406, at which the distance in the vector space between the Markov chain generated at action 404 and the nearest neighbors of the subject Markov chain may be determined. In some examples, the number of the nearest neighbors that are known to be associated with fraud/network attacks may be determined. In another examples, the average distance between the subject Markov chain and the known fraud/attack nearest neighbors may be determined.

Processing may continue at action 408, at which anomalous network activity may be detected based on the distances. For example, if the average distance between the subject Markov chain and the activity vectors representing known fraud/attacks among the nearest neighbors is below a threshold distance, anomalous network activity may be detected and remedial action may be taken. In another example, if greater than a threshold number of nearest neighbors are known to represent fraudulent activity/network attacks anomalous network activity may be detected and remedial action may be taken.

Figure 5:
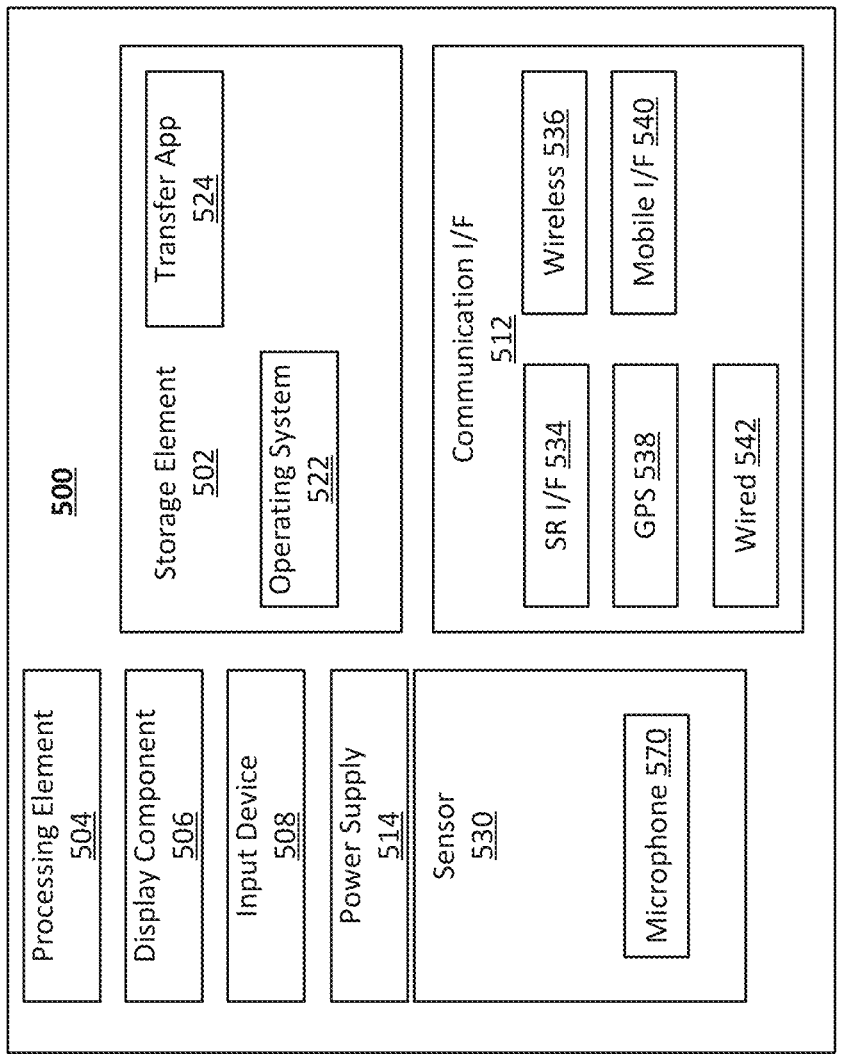
FIG. 5 is a block diagram showing an example architecture of a computing device that may be used in accordance with various embodiments described herein.

FIG. 5 is a block diagram showing an example architecture 500 of a computing device that may be configured to detect anomalous network activity, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or hierarchical data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
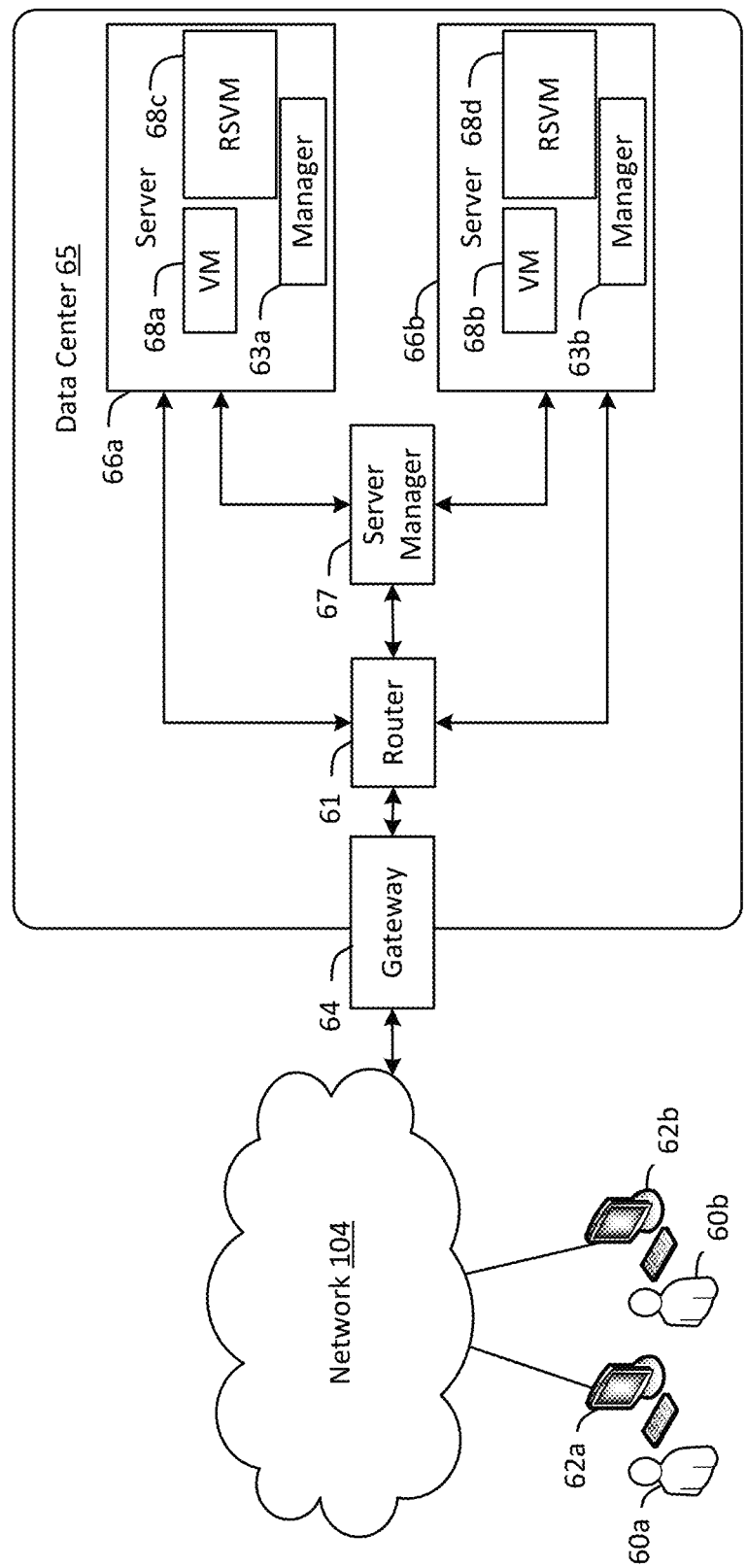
FIG. 6 is a diagram illustrating an example system for sending and providing data that may be used in accordance with the present disclosure.

An example system for sending and providing data and detecting anomalous network activity will now be described in detail. In particular, FIG. 6 illustrates an example computing environment in which the embodiments described herein may be implemented. For example, the computing environment of FIG. 6 may be configured to provide anomalous network activity detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various anomalous network activity detection techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of detecting anomalous network activity, the method comprising:
   determining, by a first computing device using log data, first sequence data representing a plurality of computer actions occurring during a past time period, wherein the first sequence data is associated with a first account;
   generating, using a first hidden Markov model executed by the first computing device, a binary hidden state vector, wherein:
      each element of the binary hidden state vector corresponds to one of the plurality of computer actions,
      a first binary value of the binary hidden state vector is associated with anomalous network activity, and
      a second binary value of the binary hidden state vector is associated with non-anomalous network activity;
   determining a binary timing vector associated with the first account, the binary timing vector including a respective element for each hour of a day, wherein:
      a third binary value of the binary timing vector indicates past computer activity, and
      a fourth binary value of the binary timing vector indicates an absence of past computer activity;
   determining, by the first computing device, a first number of elements of the binary hidden state vector that have the first binary value and which are associated with elements of the binary timing vector that have the fourth binary value; and disabling network access for the first account based on the first number of elements of the binary hidden state vector.

2. The computer-implemented method of claim 1, further comprising:
determining a first time stamp associated with a first computer action of the binary hidden state vector;
determining a first element of the binary timing vector that is associated with a first hour of the day during which the first time stamp was created; and
determining that the first element of the binary timing vector has the fourth binary value, wherein the first element is among the first number of elements of the binary hidden state vector.

3. The computer-implemented method of claim 1, further comprising:
generating, using the first hidden Markov model, a first transition probability matrix for a first hidden state; and
generating the binary hidden state vector based on a correspondence between at least a portion of the first sequence data and action probabilities of the first transition probability matrix.

4. A method of anomalous network activity detection, comprising:
receiving, by a first computing device, first application log data comprising a plurality of computer log actions, wherein the first application log data is associated with a first account;
generating, by a first hidden Markov model associated with the first account, a first hidden state vector based at least in part on the first application log data, wherein a first value of the first hidden state vector is associated with anomalous network activity;
determining, by the first computing device, a first timing vector associated with the first account, wherein the first timing vector represents first time periods associated with activity of the first account and second time periods associated with inactivity of the first account;
determining a first number of elements of the first hidden state vector having the first value and which correspond to the second time periods of the first timing vector; and
disabling access of the first account based on the first number of elements of the first hidden state vector.

5. The method of claim 4, further comprising:
generating, by a second hidden Markov model associated with the first account, a second hidden state vector, wherein a first value of the second hidden state vector is associated with the anomalous network activity and wherein the second hidden Markov model is trained using a different optimizer relative to the first hidden Markov model.

6. The method of claim 5, further comprising:
determining a second number of elements of the second hidden state vector having the first value and which correspond to the second time periods of the first timing vector;
determining a first precision score by dividing the first number of elements of the first hidden state vector by a total number of elements of the first hidden state vector having the first value; and
determining a second precision score by dividing the second number of elements of the second hidden state vector by a total number of elements of the second hidden state vector having the first value, wherein the access of the first account is disabled based at least in part on the first precision score and the second precision score.

7. The method of claim 6, further comprising:
determining an average precision score using the first precision score and the second precision score; and
disabling the access of the first account based at least in part on the average precision score exceeding a threshold precision score.

8. The method of claim 4, further comprising:
generating, by the first hidden Markov model, a first transition probability matrix associated with the first account; and
generating a first Markov chain for the first account using the first transition probability matrix.

9. The method of claim 8, further comprising:
determining, using a distance metric, a first distance between the first Markov chain and a second Markov chain, wherein the second Markov chain is associated with known anomalous network activity; and
disabling the access of the first account based at least in part on the first distance being less than a threshold distance.

10. The method of claim 8, further comprising:
determining a first number of nearest neighbors of the first Markov chain in a first vector space;
determining a subset of the first number of nearest neighbors associated with known anomalous network activity; and
disabling the access of the first account based at least in part on a number of members of the subset.

11. The method of claim 4, wherein the computer log actions include at least one of create, read, update, or delete actions.

12. The method of claim 4, wherein the first hidden state vector is a binary hidden state vector, the method further comprising:
determining a second value of the first hidden state vector;
determining a second number of elements of the first hidden state vector having the second value and which correspond to the second time periods of the first timing vector;
determining that the second number of elements of the first hidden state vector is greater than the first number of elements of the first hidden state vector; and
flipping each bit of the first hidden state vector to generate a modified hidden state vector.

13. The method of claim 4, wherein each computer log action of the plurality of computer log actions is associated with a respective timestamp indicating a time at which the computer log action occurred, wherein correspondence between the first hidden state vector and the first timing vector is determined using the timestamps.

14. A system, comprising:
at least one processor; and
at least one non-transitory computer-readable memory configured in communication with the at least one processor, the at least one non-transitory computer-readable memory storing instructions that, when executed by the at least one processor, are effective to program the at least one processor to:
receive first application log data comprising a plurality of computer log actions, wherein the first application log data is associated with a first account;
generate, by a first hidden Markov model associated with the first account, a first hidden state vector based at least in part on the first application log data, wherein a first value of the first hidden state vector is associated with anomalous network activity;

determine a first timing vector associated with the first account, wherein the first timing vector represents first time periods associated with activity of the first account and second time periods associated with inactivity of the first account;

determine a first number of elements of the first hidden state vector having the first value and which correspond to the second time periods of the first timing vector; and disable access of the first account based on the first number of elements of the first hidden state vector.

15. The system of claim 14, the at least one non-transitory computer-readable memory storing further instructions that, when executed by the at least one processor, are further effective to program the at least one processor to:

generate, by a second hidden Markov model associated with the first account, a second hidden state vector, wherein a first value of the second hidden state vector is associated with the anomalous network activity and wherein the second hidden Markov model is trained using a different optimizer relative to the first hidden Markov model.

16. The system of claim 15, the at least one non-transitory computer-readable memory storing further instructions that, when executed by the at least one processor, are further effective to program the at least one processor to:

determine a second number of elements of the second hidden state vector having the first value and which correspond to the second time periods of the first timing vector;

determine a first precision score by dividing the first number of elements of the first hidden state vector by a total number of elements of the first hidden state vector having the first value; and determine a second precision score by dividing the second number of elements of the second hidden state vector by a total number of elements of the second hidden state vector having the first value, wherein the access of the first account is disabled based at least in part on the first precision score and the second precision score.

17. The system of claim 16, the at least one non-transitory computer-readable memory storing further instructions that, when executed by the at least one processor, are further effective to program the at least one processor to:

determine an average precision score using the first precision score and the second precision score; and disable the access of the first account based at least in part on the average precision score exceeding a threshold precision score.

18. The system of claim 14, the at least one non-transitory computer-readable memory storing further instructions that, when executed by the at least one processor, are further effective to program the at least one processor to:

generate, by the first hidden Markov model, a first transition probability matrix associated with the first account; and generate a first Markov chain for the first account using the first transition probability matrix.

19. The system of claim 18, the at least one non-transitory computer-readable memory storing further instructions that, when executed by the at least one processor, are further effective to program the at least one processor to:

determine, using a distance metric, a first distance between the first Markov chain and a second Markov chain, wherein the second Markov chain is associated with known anomalous network activity; and disable the access of the first account based at least in part on the first distance being less than a threshold distance.

20. The system of claim 18, the at least one non-transitory computer-readable memory storing further instructions that, when executed by the at least one processor, are further effective to program the at least one processor to:

determine a first number of nearest neighbors of the first Markov chain in a first vector space;

determine a subset of the first number of nearest neighbors associated with known anomalous network activity; and disable the access of the first account based at least in part on a number of members of the subset.

* * * * *